US007315889B2

(12) United States Patent
Ono et al.

(10) Patent No.: US 7,315,889 B2
(45) Date of Patent: Jan. 1, 2008

(54) PRINTER SERVER AND PRINT SYSTEM

(75) Inventors: Yoshiyuki Ono, Nagano-Ken (JP); Susumu Shiohara, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 704 days.

(21) Appl. No.: 10/114,296

(22) Filed: Apr. 3, 2002

(65) Prior Publication Data

US 2002/0186398 A1 Dec. 12, 2002

(30) Foreign Application Priority Data

Jun. 7, 2001 (JP) ............................. 2001-172345

(51) Int. Cl.
*G06F 15/173* (2006.01)
(52) U.S. Cl. ...................... 709/223; 709/200; 709/218; 709/224; 358/1.14; 358/1.15
(58) Field of Classification Search ........ 709/200–213, 709/217–218, 234, 223–224, 226; 358/1.14–1.15, 358/406, 468, 1.1
See application file for complete search history.

(56) References Cited

U.S. PATENT DOCUMENTS

| 5,450,571 A * | 9/1995 | Rosekrans et al. ............ 703/24 |
| 5,467,434 A * | 11/1995 | Hower et al. ............... 358/1.15 |
| 5,930,465 A * | 7/1999 | Bellucco et al. ............ 358/1.15 |
| 5,978,560 A * | 11/1999 | Tan et al. ................... 358/1.15 |
| 6,288,790 B1 * | 9/2001 | Yellepeddy et al. ......... 358/1.15 |
| 6,498,656 B1 * | 12/2002 | Mastie et al. ............... 358/1.15 |
| 6,552,813 B2 * | 4/2003 | Yacoub ....................... 358/1.1 |
| 6,587,953 B1 * | 7/2003 | Torikai ....................... 713/330 |
| 6,621,589 B1 * | 9/2003 | Al-Kazily et al. .......... 358/1.15 |
| 6,671,724 B1 * | 12/2003 | Pandya et al. .............. 709/226 |
| 6,687,018 B1 * | 2/2004 | Leong et al. ............... 358/1.15 |
| 6,714,964 B1 * | 3/2004 | Stewart et al. .............. 709/203 |
| 6,874,034 B1 * | 3/2005 | Hertling ..................... 709/245 |
| 6,904,452 B2 * | 6/2005 | Sedky et al. ................ 709/203 |
| 6,924,906 B1 * | 8/2005 | Schwier et al. ............. 358/1.6 |
| 6,925,481 B2 * | 8/2005 | Singhal et al. .............. 709/200 |
| 7,016,061 B1 * | 3/2006 | Hewitt ....................... 358/1.15 |
| 2002/0063886 A1 * | 5/2002 | Johnson ..................... 358/1.15 |
| 2002/0075510 A1 * | 6/2002 | Martinez .................... 358/1.15 |
| 2002/0089692 A1 * | 7/2002 | Ferlitsch .................... 358/1.15 |
| 2002/0138558 A1 * | 9/2002 | Fertlisch .................... 709/203 |
| 2002/0196463 A1 * | 12/2002 | Schlonski et al. .......... 358/1.15 |

(Continued)

FOREIGN PATENT DOCUMENTS

JP 08-102740 4/1996

(Continued)

*Primary Examiner*—Thu Ha Nguyen
(74) *Attorney, Agent, or Firm*—Mattingly, Stanger, Malur & Brundidge, PC

(57) ABSTRACT

A printer server 20 periodically grasps a communication performance between the printer server 20 and printers PT1 through PT5 and generates a communication performance list LS10 which is sorted in the order of the good communication performance. The printer server 20 transmits the communication performance list LS10 to computers PC1 through PC5. A user transmits a print data to a print queue corresponding to the printer with the best communication performance according to the communication performance list LS10. Therefore, a waiting time for print can be shortened for the user.

13 Claims, 7 Drawing Sheets

U.S. PATENT DOCUMENTS

2004/0008363 A1 * 1/2004 Suzuki et al. .............. 358/1.14

FOREIGN PATENT DOCUMENTS

| JP | 409146727 A | * | 6/1997 |
| JP | 11-110174 | | 4/1999 |
| JP | 2002-264431 | | 9/2002 |
| JP | 2003-280843 A | * | 10/2003 |

* cited by examiner

| SELECTION BOX | ORDER | PRINT QUEUE | PRINTER |
|---|---|---|---|
| BX1 ☑ | 1 | PRINT QUEUE Q1 | PRINTER PT1 |
| BX2 ☐ | 2 | PRINT QUEUE Q4 | PRINTER PT4 |
| BX3 ☐ | 3 | PRINT QUEUE Q2 | PRINTER PT2 |
| BX4 ☐ | 4 | PRINT QUEUE Q3 | PRINTER PT3 |
| BX5 ☐ | 5 | PRINT QUEUE Q5 | PRINTER PT5 |

ORDER OF GOOD COMMUNICATION PERFORMANCE

W10: COMMUNICATION PERFORMANCE DISPLAY WINDOW

FIG. 5

PRINTER SERVER AND PRINT SYSTEM

BACKGROUND OF THE INVENTION

1. Field of the Invention

This invention relates to a printer server and a print system, and more particularly to a printer server connected to a radio device such as a printer by using radio and a print system including such a printer server.

2. Description of the Related Art

A connection standard that a computer and a printer are connected together by radio instead of a wire cable is proposed. For example, there is an IEEE 802.11b standard as this connection standard. In such a wireless environment, a user can transmit a print data from the computer to the printer via radio.

This is a one-to-one relationship between the computer and the printer, however, another connection standard is also proposed to constitute a wireless LAN (Local Area Network) so that one or more computers and one or more printers are connected via radio in the wireless LAN. In such a wireless environment, a printer sever and the printers are connected together by the wireless LAN. In this case, a print data transmitted from the computer to the printer server is transmitted to the printer by using radio.

In a case where a plurality of printers are connected to one printer sever, a communication performance between the printers and the printer sever is significantly different in accordance with a radio environment of neighborhood. Because, in the radio communication, there is a possibility that a device radiating other radio exits in the neighborhood, so that radio interference and/or noise caused by such radio have a great influence on the communication performance between the printer sever and the printers. Therefore, the communication performance for transmitting a print data to the printer is dynamically changed in accordance with time and/or setting environment.

In general, in the wireless LAN environment, it is known that the performance in the situation of bad communication performance is less than one fifth of that in the situation of good communication performance. If a user performs the print operation in such bad communication performance, its waiting time for the print is longer than five times of a waiting time in the good communication performance at the maximum.

SUMMARY OF THE INVENTION

It is therefore an object of the invention that, in a print system in which a printer server and one or more printers are connected via radio, a user can perform a print operation in the printer of good communication performance.

In order to accomplish the aforementioned and other objects, according to one aspect of the present invention, a printer server to which one or more printers are connected via radio, comprising:

one or more print queues, each of which corresponds to one of the printers, wherein a print data transmitted from a computer is stored in one of the print queues;

a print queue manager which transmits the print data stored in the print queues to the printer corresponding to the print queue via radio according to print completion of the corresponding printer; and a communication performance list generator which communicates with the printers to check communication conditions on radio between the printer server and the printers, and which generates a communication performance list in which the printers and/or the print queues are sorted according to at least the checked communication conditions.

According to another aspect of the present invention, a print system comprising:

one or more printers;

one or more computers; and a printer server to which the printers are connected via radio and to which the computers are connected, wherein the printer server comprises:

one or more print queues, each of which corresponds to one of the printers, wherein a print data transmitted from one of the computers is stored in one of the print queues;

a print queue manager which transmits the print data stored in the print queues to the printer corresponding to the print queue via radio according to print completion of the corresponding printer; and a communication performance list generator which communicates with the printers to check communication conditions on radio between the printer server and the printers, and which generates a communication performance list in which the printers and/or the print queues are sorted according to at least the checked communication conditions.

BRIEF DESCRIPTION OF THE DRAWINGS

FIG. 5 is a diagram showing a communication performance display window which is displayed on a computer screen according to the embodiment;

DETAILED DESCRIPTION OF THE INVENTION

According to a print system of one embodiment of the invention, the print system has a printer server and one or more printers connected together via radio, the printer server grasps communication conditions between the printer sever and the printers managed thereby, so that a user can voluntarily select one printer in good communication conditions and then transmit a print data to be printed by the selected printer to the printer server. More detailed explanation is made below.

First of all, a system configuration of a print system 10 according to this embodiment will be explained on the basis of FIG. 1.

Figure 1:
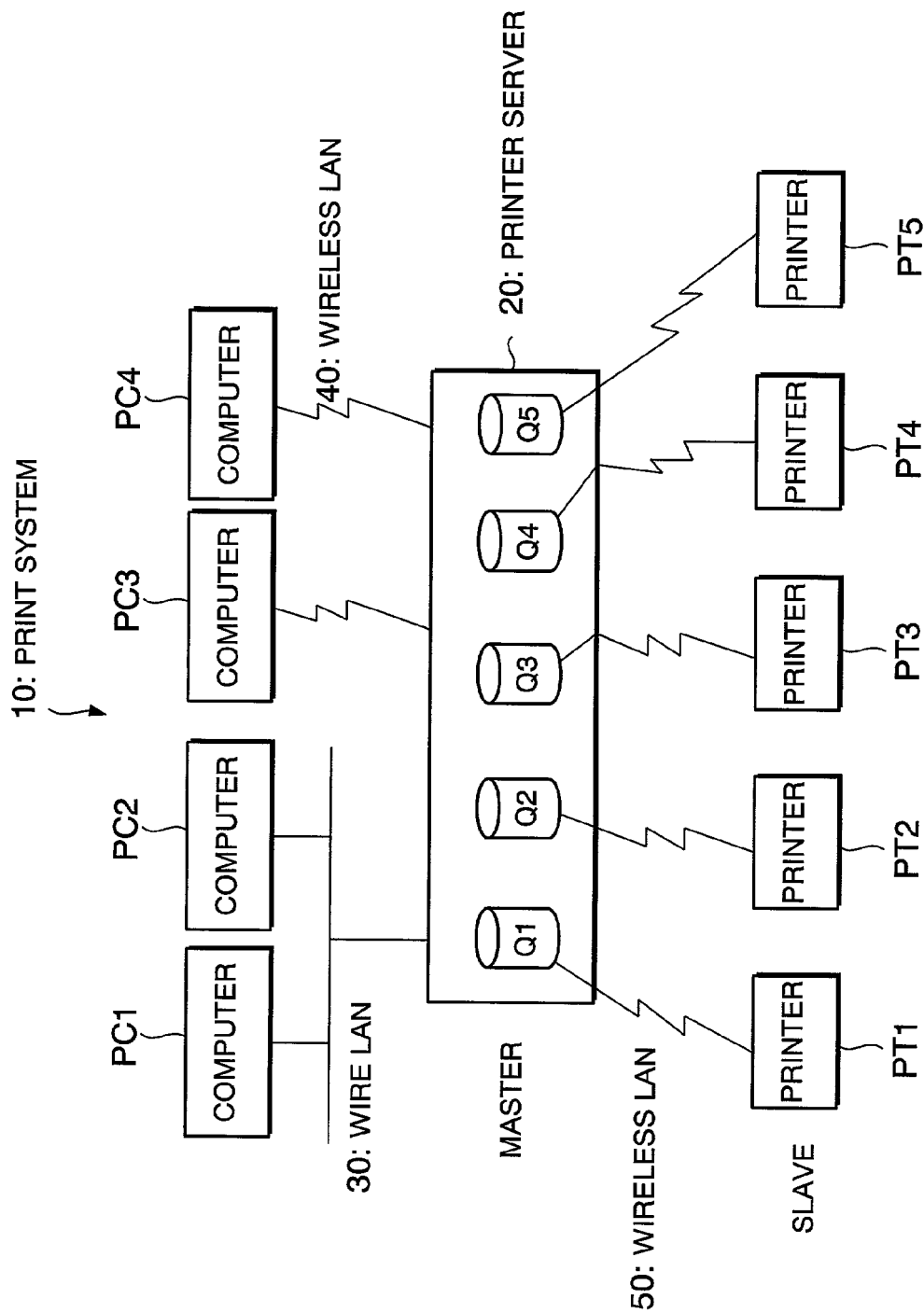
FIG. 1 is a block diagram for explaining a structure of a print system according to an embodiment of the invention.

As shown in FIG. 1, the print system 10 of this embodiment has a printer server 20. One or more computers PC are connected to the printer server 20. For example, in this embodiment, computers PC1 and PC2 are connected to the printer server 20 via a wire LAN 30. A typical example of the wire LAN 30 is an Ethernet. Furthermore, computers PC3 and PC4 are connected to the printer server 20 via a wireless LAN 40. A typical example of a communication standard for the wireless LAN 40 is a Blue Tooth.

One ore more printers PT are also connected to the printer server 20. For example, in this embodiment, printers PT1 through PT5 are connected to the printer server 20 via a wireless LAN 50. In this embodiment, the printer server 20 constitutes a master, and the printers PT1 through PT5 constitute slaves. In addition, a typical example of the wireless LAN 50 between the printer server 20 and the printers PT1 through PT5 is also the Blue Tooth. Another example is Wireless Network in compliance with IEEE 802.11b standard.

One or more print queues are formed in the printer server 20, the number of the print queues is the same as that of printers PT connected to the printer server 20. That is, in this embodiment, since five printers PT1 through PT5 are connected to the printer server 20, five print queues Q1 through Q5 are formed therein. A plurality of print data transmitted from the computers PC are stored in the print queues Q1 through Q5, and then they are sequentially transmitted to the corresponding one of the printers PC via the wireless LAN 50.

Concerning these five print queues Q1 through Q5, the printer server 20 grasps a communication performance of the corresponding printers PT1 though PT5. More specifically, the printer server 20 periodically catches radio conditions between the printer server 20 and the printers PT1 through PT5, obtains their profiles, and generates a list of the communication performance in the order of the good radio conditions. Then, the printer server 20 informs the list of the communication performance to a user, so that the user can select one print queue corresponding to the printer PT which is the good communication conditions in accordance with the list and transmit a print data thereto.

In this embodiment, each of the print queues Q1 through Q5 has an identifying ID. Therefore, the user specifies the identifying ID and transmits the print data, so that it is possible to store the print data in the designated print queue.

Figure 2:
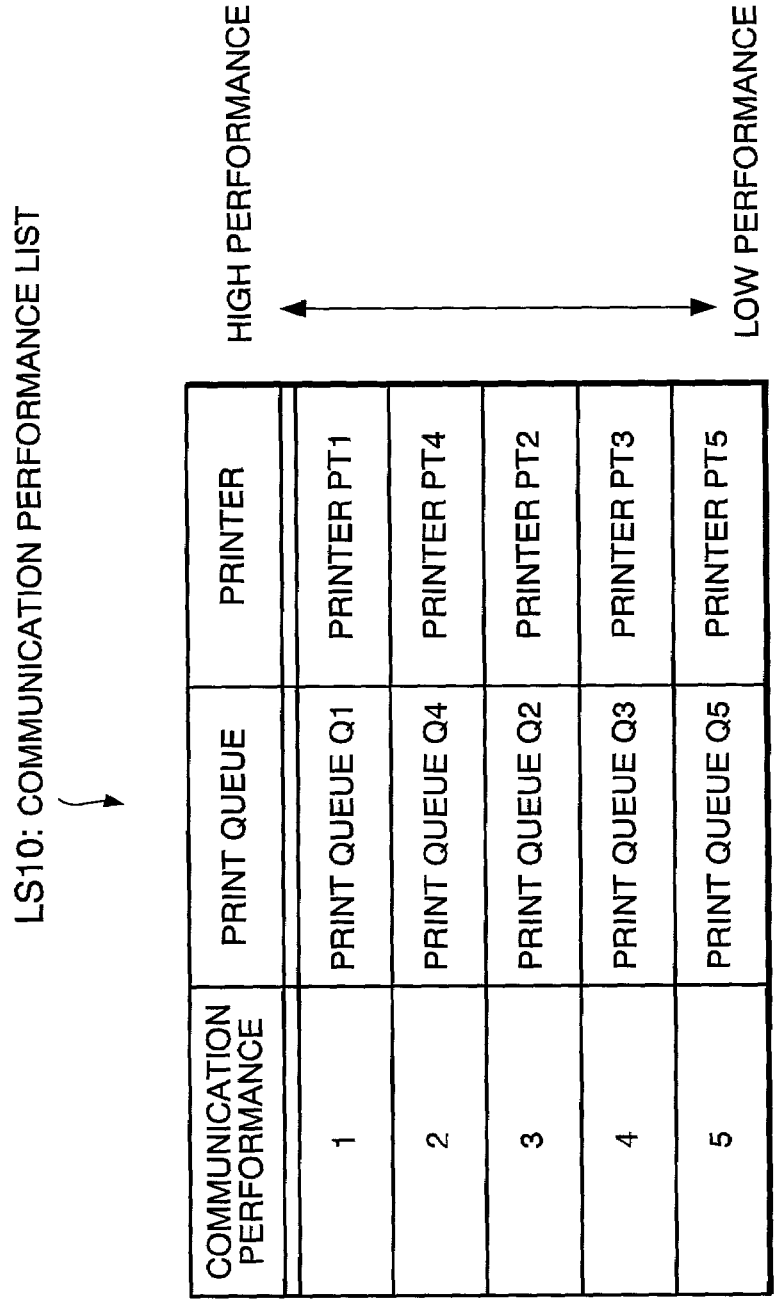
FIG. 2 is a diagram which illustrates one example of a communication performance list generated by a printer server according to the embodiment.

FIG. 2 is a diagram for illustrating one example of a communication performance list LS10 generated by the printer server 20.

As shown in FIG. 2, the printer server 20 arranges the print queues Q1 through Q5 and the printers PT1 through PT5 corresponding thereto in the order of the good communication performance and manages them as the list. In the example of FIG. 2, communication conditions between the printer server 20 and the printer PT1 is the best, whereas communication conditions between the printer server 20 and the printer PT5 is the worst. Thus, when the user transmits the print data to the print queue Q1, the user can expect a print completion to be at a minimum of print waiting time. The print data stored in the print queue Q1 is sequentially transmitted to the printer PT1 via the wireless LAN 50 in accordance with print process conditions of the printer PT1.

The printer server 20 periodically communicates with each of the printers PT1 through PT5 to obtain the communication conditions, so that the communication performance list LS10 shown in FIG. 2 is updated at a given timing.

Figure 3:
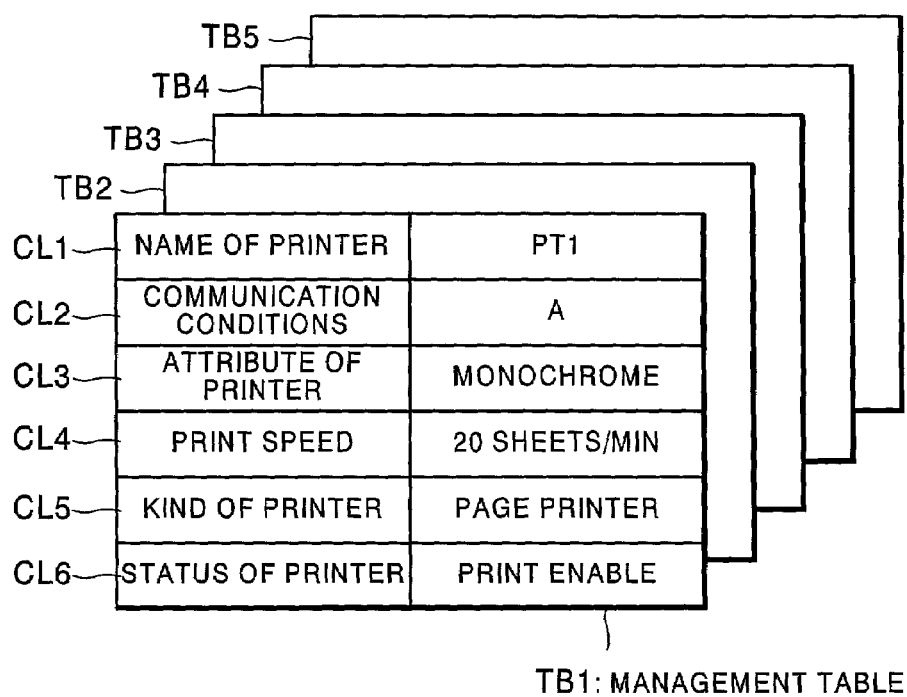
FIG. 3 is a diagram which illustrates one example of management tables generated by the printer server according to the embodiment.

FIG. 3 is a diagram showing one example of management tables TB1 through TB5. The printer server 20 periodically communicates with the printers PT1 through PT5, so that each of the management tables TB1 through TB5 is formed for the corresponding one of the printers PT1 through PT5.

As shown in FIG. 3, each of the management tables TB1 through TB5 has a name of a printer CL1, communication conditions CL2, an attribute of a printer CL3, a print speed CL4, a kind of a printer CL5 and status of a printer CL6, as items. The name of the printer CL1 s a name which is assigned to each of the printers PT1 through PT5, and it is unique identifying information for specifying one printer in this embodiment. The communication conditions CL2 indicates communication conditions between the printer server 20 and the printer PT, and it is classified into five ranks of A, B, C, D and E in this embodiment. The printer server 20 inspects the conditions of radio received from the printer PT and decides which rank is assigned in accordance with the result of inspection.

The attribute of the printer CL3 indicates an attribute of the printer PT, for example, it indicates information that the printer PT is a color printer or a monochrome printer. The print speed CL4 indicates a print speed of the printer PT, for example, it indicates information how many sheets the printer PT can print per one minute. The kind of the printer CL5 indicates a kind of the printer PT, for example, it indicates information that the printer PT is a page printer or a inkjet printer. The status of a printer CL6 indicates a present status of the printer PT, for example, it indicates information about a print enable, a print error and so forth.

Among the items of the management table, the information of the items other than the communication conditions CL2 are transmitted from the printer PT to the printer server 20. More specifically, the printer server 20 can obtain the information of the name of the printer CL1, the attribute of the printer CL3, the print speed CL4, the kind of the printer CL5 and the status of the printer CL6 by receiving them from the printer PT.

On the basis of the rank of the communication conditions CL2 in these management tables TB1 through TB5, the printer server 20 generates the communication performance list LS10 shown in FIG. 2. More specifically, the printer server 20 compares the ranks of the communication conditions CL2 between the printers PT1 through PT5 and sorts the printers PT1 through PT5 and/or the print queues Q1 through Q5 in the order of good conditions to generate the communication performance list LS10. In addition, the communication performance list LS10 includes the items of both the printer and the print queue in this embodiment, but the communication performance list LS10 may include only one of the printer and the print queue.

In addition, in this embodiment, if there are a plurality of printers PT in the same rank of the communication conditions CL2, then the printer PT having faster print speed in the print speed CL4 has higher priority and the order of better communication conditions is assigned thereto.

Next, the hardware structure of the printer sever 20 will be explained on the basis of FIG. 4, which is a block diagram showing the hardware structure of the printer server 20.

Figure 4:
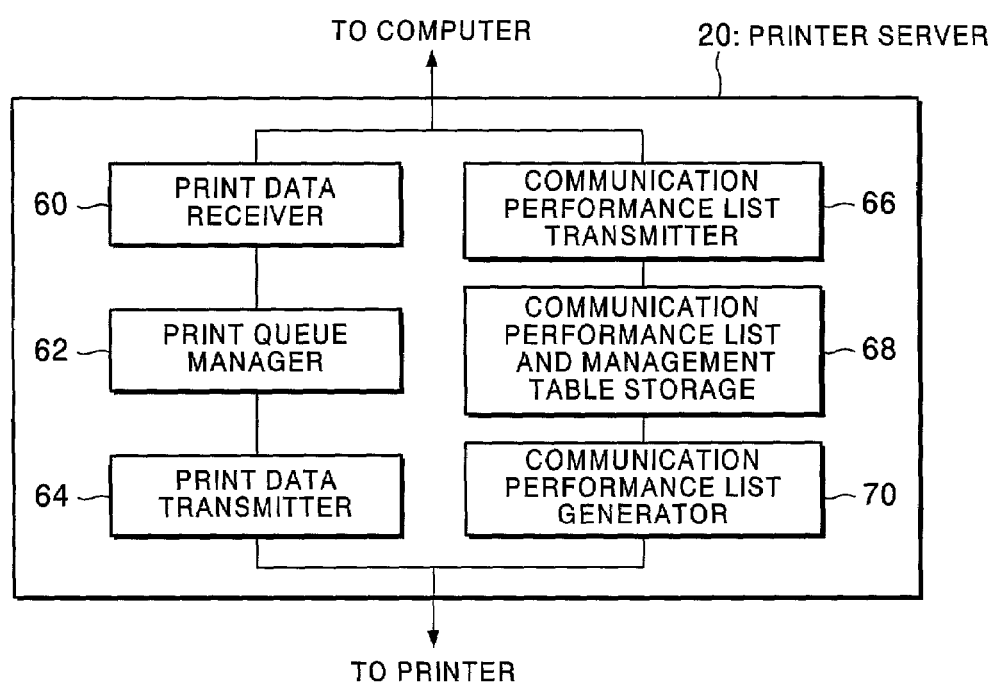
FIG. 4 is a block diagram showing one example of a hardware structure of the printer server according to the embodiment.

As shown in FIG. 4, the printer server 20 includes a print data receiver 60, a print queue manager 62, a print data transmitter 64, a communication performance list transmitter 66, a communication performance list and management table storage 68 and a communication performance list generator 70.

The print data receiver 60 receives a print data transmitted from the computers PC. The print data includes a header, and the header designates one print queue in which the print data to be transmitted from now is stored. In this embodiment, this designation is performed using the identifying ID of the print queue mentioned above. According to this designation, the print data receiver 60 stores the received print data in one of the print queues Q1 through Q5.

The print queue manager 62 manages the print data stored in the print queues Q1 through Q5. More specifically, the print queue manager 62 transmits the print data which has been stored in the print queues Q1 through Q5 to the printers PT1 through PT5 via the print data transmitter 64 in accordance with print operation completion of the printers PT1 through PT5 corresponding to the print queues Q1 through Q5. For example, if print operation of the printer PT1 has been completed and a print data has been stored in the print queue Q1, the printer server 20 transmits it to the print data transmitter 64 and deletes it from the print queue Q1. The print data transmitter 64 transmits this print data to the printer PT1 via the wireless LAN 50.

The communication performance list generator 70 periodically communicates with each of the printers PT1 through PT5 via the wireless LAN 50 and checks their communication performance between the printer server 20 and each of the printers PT1 through PT5. Then, the communication performance list generator 70 generates the management tables TB1 through TB5 and the communication performance list LS10 on the basis of the checked communication performance and stores them in the communication performance list and management table storage 68.

The communication performance list transmitter 66 transmits the communication performance list LS10 which has been stored in the communication performance list and management table storage 68 to the computers PC1 through PC4. There are various timings that the communication performance list LS10 is transmitted. For example, the communication performance list transmitter 66 may transmit it on the basis of a request of each of the computers PC1 through PC4, or may periodically transmit it to each of the computers PC1 though PC4.

Each of computers PC1 through PC4 receives the communication performance list LS10 and displays it on the screen on the basis of the user's operation. FIG. 5 is a diagram showing one example of a communication performance display window W10 which is displayed on the screen in this case.

For example, the communication performance display window W10 is displayed if the user of the computer PC1 inputs an instruction to display the communication performance display window W10 to the computer PC1. Based on the display, the user who attempts to transmit a print data can know which printer is the best communication condition. Therefore, the user can instruct the computer PC1 to transmit the print data to the printer of the best communication condition, i.e. to the print queue of the best. In this embodiment, the printer to print is specified by storing the identifying ID corresponding to the printer designated by the user in the header in the print data.

For example, in the example of FIG. 5, selection boxes BX1 through BX5 are displayed on the communication performance display window W10. These selection boxes BX1 through Bx5 correspond to the print queues Q1 through Q5, respectively, they therefore correspond to the printers PT1 through PT5, respectively. Accordingly, the user operates a mouse and checks one of the selection boxes BX1 through BX5, so that the user can designate one print queue in which the print data to be printed is stored and then the user can designate one printer which prints the print data. In the example of FIG. 5, the user will check and select the selection box BX1 so as to print the print data with the printer PT1 which has the best communication conditions. As a result, the print queue Q1 is designated as the print queue in which the print data is stored, and the printer PT1 is designated as the printer to print the print data.

In a case where the selection of one selection box by the user is regarded as designation of one print queue in which the print data is stored, the print data receiver 60 stores the print data in the designated print queue. On the other hand, in a case where the selection of one selection box by the user is regarded as designation of one printer PT which prints the print data, the print data receiver 60 stores the print data in the queue corresponding to the designated printer PT.

Figure 6:
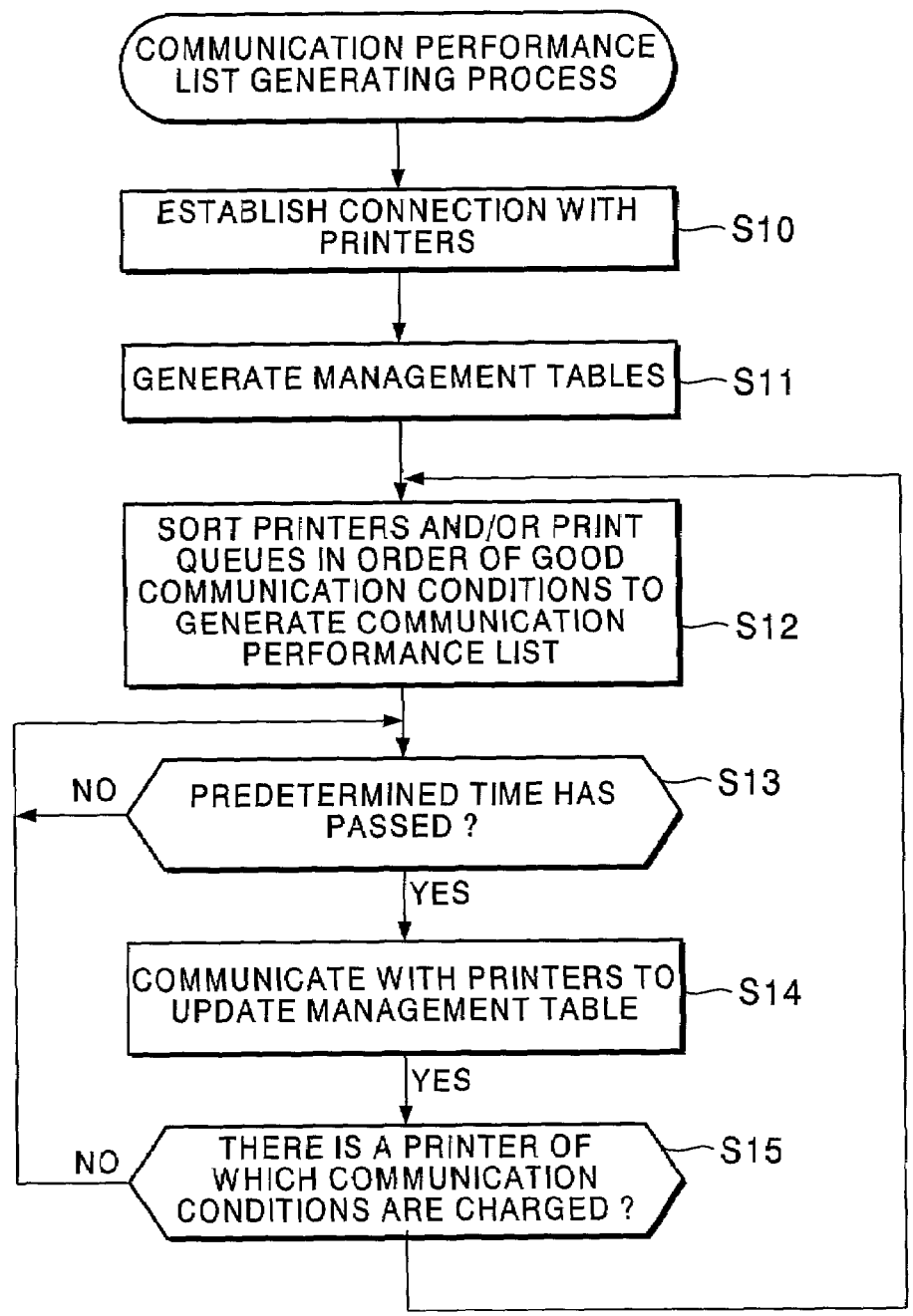
FIG. 6 is a flow chart for explaining a communication performance list generating process which is executed in a communication performance list generator of the printer server according to the embodiment.

Next, with reference to FIG. 6, a communication performance list generating process executed in the communication performance list generator 70 will be explained in detail. As shown in FIG. 6, when the printer server 20 starts up, the communication performance list generator 70 establishes communications with the printers PT1 through PT5 (step S10). That is, the communication performance list generator 70 establishes communications between the printer server 20 and each of the printers PT1 through PT5 via the wireless LAN 50.

Next, the communication performance list generator 70 communicates with each of the printers PT1 through PT5 to generate the management tables TB1 through TB5, and then the communication performance list generator 70 stores them in the the communication performance list and management table storage 68 (step S11). Subsequently, the communication performance list generator 70 sorts the printers and/or the print queues in the order of good communication conditions according to the management tables TB1 through TB5 to generate a communication performance list LS10 (step S12), and stores it in the communication performance list and management table storage 68.

Next, the communication performance list generator 70 judges whether or not a predetermined time has passed since the communication performance list LS10 was generated (step 13). For instance, the predetermined time is two minutes or four minutes. If the predetermined time has not passed yet (step 13: No), the process of step S13 is repeated for waiting.

On the other hand, the predetermined time has passed (step S13: Yes), the communication performance list generator 70 communicates with each of the printers PT1 through PT5 to obtain new profiles of communication conditions and the communication performance list generator 70 updates the management tables TB1 through TB5 which have been stored in the communication performance list and management table storage 68 (step S14). Then, the communication performance list generator 70 judges whether or not there is a printer of which its rank in the communication conditions CL2 has been changed (step S15).

If the printer of which the rank in the communication conditions CL2 has been changed exists (step S15: Yes), it returns to step S12 mentioned above. That it, according to the ranks in the communication conditions CL2, the communication performance list generator 70 sorts the printers and/or print queues in the communication performance list LS10, again. On the other hand, the printer of which the rank in the communication conditions CL2 has been changed does not exist (step S15: No), it returns to step S13 mentioned above. That is, the communication performance list generator 70 judges whether or not the predetermined time has passed since the management tables TB1 through TB5 was updated (step S13), and it repeats the process of step S13 for waiting until another predetermined time is passed.

As explained above, in the print system 10 according to this embodiment, the user can transmit the print data to the print queue in the best communication performance on the basis of the communication performance display window W10 displayed on the screen, so that the print waiting time for the user can be shortened.

More specifically, the printer sever 20 periodically grasps the communication conditions of each of the printers PT1 through PT5, and then the printer sever 20 generates the communication performance list LS10 according to this communication conditions. The communication performance list LS10 is transmitted to each of the computers PC1 through PC4, and then the communication performance display window W10 is displayed according to the communication performance list LS10. Therefore, the user can recognize which is the best communication condition of the printers from the communication performance display window W10. As a result, when the user transmits the print data to the printer server 20, the user can transmits the print data to one print queue corresponding to the best printer of the communication conditions.

Figure 7:
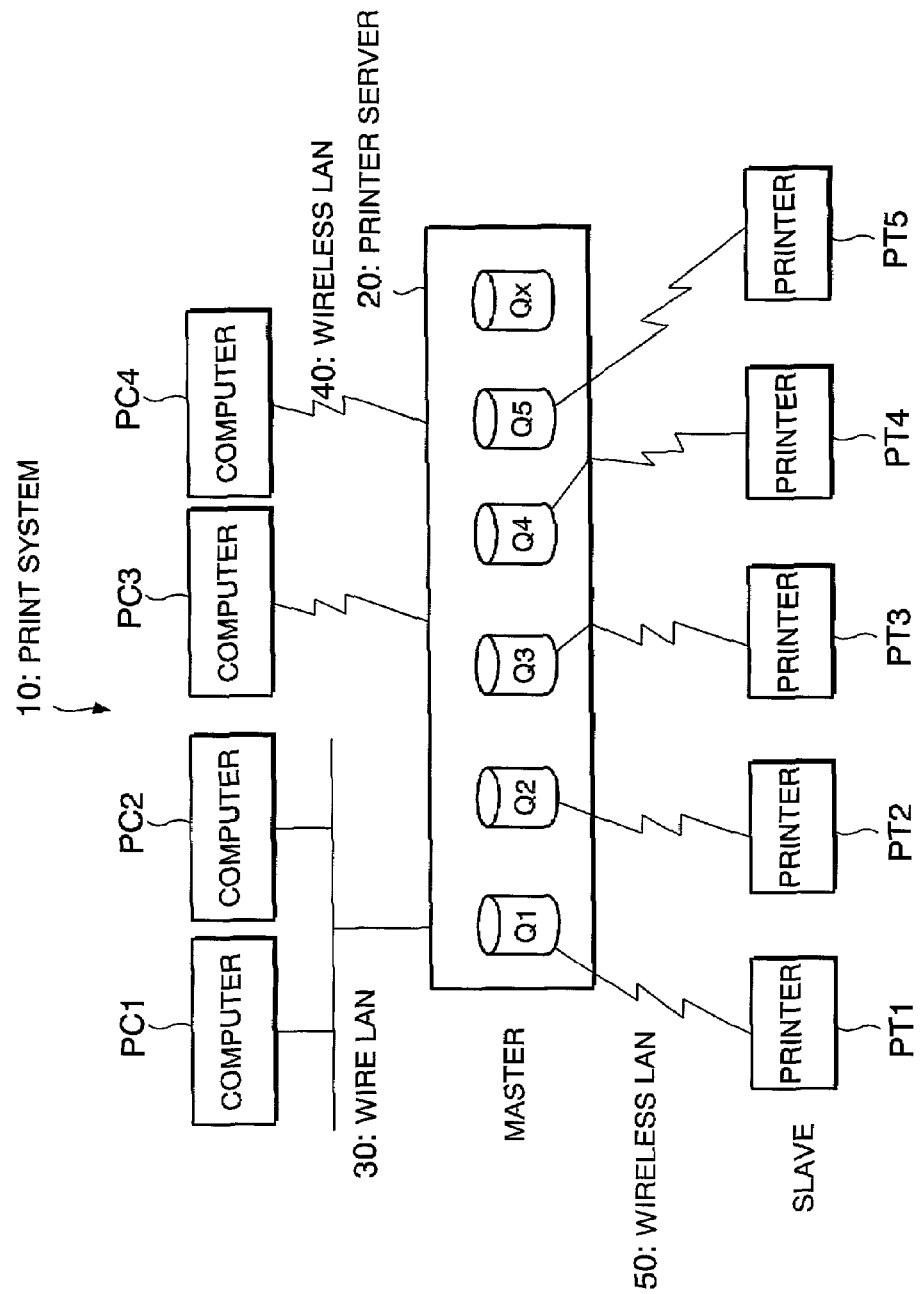
FIG. 7 is a block diagram for explaining a structure of a print system according to a modified example of the embodiment.

The present invention is not limited to the embodiment explained above, but various changes or modifications are possible. For example, as shown in FIG. 7, a special print queue Qx, which does not correspond to a specific one of the printers PT1 through PT5, is additionally provided, and then the printer server 20 automatically and always assigns the printer of the best communication conditions to the special print queue Qx. Specifically, when the print data receiver 60 receives a print data which has been designated to be stored in the special print queue Qx, the print data receiver 60 stores the print data in the special print queue Qx. If any print data has been stored in the special print queue Qx, then the print queue manager 62 transmits the print data to one printer of the best communication conditions with reference to the communication performance list LS10.

In this manner, if the user transmits a print data to the special print queue Qx, then one printer of the best communication conditions automatically prints the print data. Therefore, it is unnecessary for the user to take care which is the printer of the best communication performance, but the print operation is automatically carried out by the printer of the best communication conditions. In this case, a relationship between the special print queue Qx and the printer PT is not fixed, but dynamic.

In addition, in the embodiment mentioned above, the print system 10 is taken as an example for explaining the present invention, but the present invention is applicable to a system other than print system. Specifically, a radio device corresponding to the slave is not limited to the printer PT, and a radio device management apparatus corresponding to the master is not limited to the print server 20. In other words, the present invention is applicable to the radio device management apparatus to which one or more the radio devices are connected. In this case, data storage queues are provided for the radio devices in the radio device management apparatus, respectively, so that the radio device management apparatus stores a data transmitted from a computer in one of the data storage queues, and sequentially transmits the data which has been stored in the data storage queues to the corresponding one of the radio devices.

Concerning the processing explained in the above-mentioned embodiment, the programs for executing the processing can be stored on and distributed in the form of a recording medium, for example, a flexible disk, a CD-ROM (compact disc read only memory), a ROM, a memory card, etc. In this case, once the print server 20 reads such programs from the recording medium and executes the programs, the embodiment explained above can be realized.

In many cases, the print server 20 has other programs such as an operating system, other application programs, and so on. In these cases, in order to efficiently use the other programs of the printer server 20, instructions may be recorded on the recording medium for calling, from the other programs of the print server 20, one or more programs that can realize processing equivalent to the processing of the above-mentioned embodiment.

Moreover, these programs may also be distributed as a carrier wave through a network, instead of the recording medium. The programs, transmitted as the carrier wave through the network, can be stored in the print server 20 and executed to realize the above-mentioned embodiment.

In some cases, the programs are encrypted and/or compressed when they are recorded on a recording medium or transmitted as the carrier wave through the network. In these cases, having acquired the programs from the recording medium or the carrier wave, the print server 20 has to decrypt and/or expand the programs before executing them.

What is claimed is:

1. A printer server to which one or more printers are connected via radio, comprising:
   plurality of print queues, each of which corresponds to one of the printers, wherein a print data transmitted from a computer is stored in one of the plurality of print queues;
   a print queue manager which transmits the print data stored in one of the print queues to one of the printers corresponding to one of the plurality of print queues via the radio according to print completion of the one of the printers;
   a communication performance list generator which performs inspection of the radio received from the one or more printers to check communication conditions between the printer server and the one or more printers, and which generates a communication performance list in which at least one of the one or more printers and the plurality of print queues are sorted according to at least a result of the inspection;
   a communication performance list transmitter which transmits the communication performance list to the computer;
   a special print queue which does not correspond to a specific printer, wherein a print data transmitted from the computer is stored in the special print queue and the print queue manager transmits the print data stored in the special print queue to one of the printers which is best in communication conditions; and
   a print data receiver which receives a print data transmitted from the computer and stores it in the one of the plurality of print queues or the special print queue which has been designated by the computer in accordance with the communication performance list,
   wherein the communication performance list generator classifies the checked communication conditions into a plurality of ranks and sorts the one or more printers and the plurality of print queues according to the ranks.

2. The printer server as set forth in claim 1, wherein the communication performance list generator periodically checks the communication conditions between the printer server and the printers to update the communication performance list.

3. The printer server as set forth in claim 1, wherein the print data receiver stores the received print data in the one of the print queues which has been designated by the computer.

4. The printer server as set forth in claim 1, wherein the print data receiver stores the received print data in the one of the print queues corresponding to one of the printers which has been designated by the computer.

5. The printer server as set forth in claim 1, wherein, when there are ones of the one or more printers and the plurality of print queues in a same one of the ranks, the communication performance list generator sorts the ones of the printers and print queues in the same one of the ranks according to given priority.

6. A print system comprising:
one or more printers;
one or more computers; and
a printer server to which the one or more printers are connected via radio and to which the one or more computers are connected,
wherein the printer server comprises:
plurality of print queues, each of which corresponds to one of the printers, wherein a print data transmitted from one of the computers is stored in one of the plurality of print queues;
a print queue manager which transmits the print data stored in one of the plurality of print queues to one of the printers corresponding to the one of the plurality of print queues via the radio according to print completion of the one of the printers;
a communication performance list generator which performs inspection of the radio received from the one or more printers to check communication conditions between the printer server and the one or more printers, and which generates a communication performance list in which at least one of the one or more printers and the plurality of print queues are sorted according to at least a result of the inspection;
a communication performance list transmitter which transmits the communication performance list to at least one of the computers; and
a special print queue which does not correspond to a specific printer, wherein a print data transmitted from one of the computers is stored in the special print queue and the print queue manager transmits the print data stored in the special print queue to one of the printers which is best in communication conditions,
wherein one of the computers further comprises a print queue designate section which causes a user to designate one of the plurality of print queues or the special print queue in which a print data to be transmitted by the user is stored in accordance with the communication performance list,
wherein the printer server further comprises a print data receiver which receives a print data transmitted from one of the computers and stores it in the one of the plurality of print queues or the special print queue designated by the print queue designate section, and
wherein the communication performance list generator classifies the checked communication conditions into a plurality of ranks and sorts the one or more printers and the plurality of print queues according to the ranks.

7. The print system as set forth in claim 6, wherein the communication performance list generator periodically checks the communication conditions between the printer server and the printers to update the communication performance list.

8. The print system as set forth in claim 6, wherein one of the computers comprises a display section which displays the communication performance list received from the communication performance list transmitter on a screen thereof.

9. The print system as set forth in claim 8, wherein the computer further comprises a printer designate section which causes a user to designate one of the printers which prints a print data to be transmitted by the user.

10. The print system as set forth in claim 9, wherein the printer server further comprises a print data receiver which receives the print data transmitted from one of the computers and stores it in one of the plurality of print queues.

11. The print system as set forth in claim 10, wherein the print data receiver stores the received print data in the one of the plurality of print queues corresponding to the printer designated by the printer designate section.

12. The print system as set forth in claim 6, wherein, when there are ones of the one or more printers and the plurality of print queues in a same one of the ranks, the communication performance list generator sorts the one or more printers and the plurality of print queues in the same one of the ranks according to given priority.

13. The print system as set forth in claim 6, wherein the printer server further comprises a print data receiver which receives the print data transmitted from one of the computers for storage in one of the plurality of print queues.

* * * * *